United States Patent [19]
Joly et al.

[11] 4,023,778
[45] May 17, 1977

[54] DEVICE FOR MIXING CHEMICAL PRODUCTS WITH TAP WATER

[75] Inventors: Michel Joly, Villeurbanne; Jean-Noël Tabet, Lyon, both of France

[73] Assignee: Sogemaric, Paris, France

[22] Filed: May 29, 1975

[21] Appl. No.: 581,721

[30] Foreign Application Priority Data

May 31, 1974 France ............................ 74.19647

[52] U.S. Cl. .............................. 259/4 R; 239/310
[51] Int. Cl.² ...................................... B01F 15/00
[58] Field of Search ........... 259/4 R; 239/310, 315, 239/316

[56] References Cited
UNITED STATES PATENTS

| 2,062,704 | 12/1936 | Forsyth | 239/310 |
| 3,070,316 | 12/1962 | Miville | 239/315 |
| 3,583,681 | 6/1971 | Brown | 259/4 R |
| 3,776,702 | 12/1973 | Chant | 259/4 R |
| 3,829,024 | 8/1974 | Heden | 239/310 |
| 3,893,655 | 7/1975 | Sandiford | 259/4 R |

Primary Examiner—Richard E. Aegerter
Assistant Examiner—L. Footland
Attorney, Agent, or Firm—McDougall, Hersh & Scott

[57] ABSTRACT

A device for mixing chemical products with tap water. It comprises a magazine intended to accommodate the chemical products in the form of a solid compact so that they have at least one free surface which remains constant during splitting and means for introducing tap water tangentially of that surface. Application in the domestic and garden sectors.

12 Claims, 8 Drawing Figures

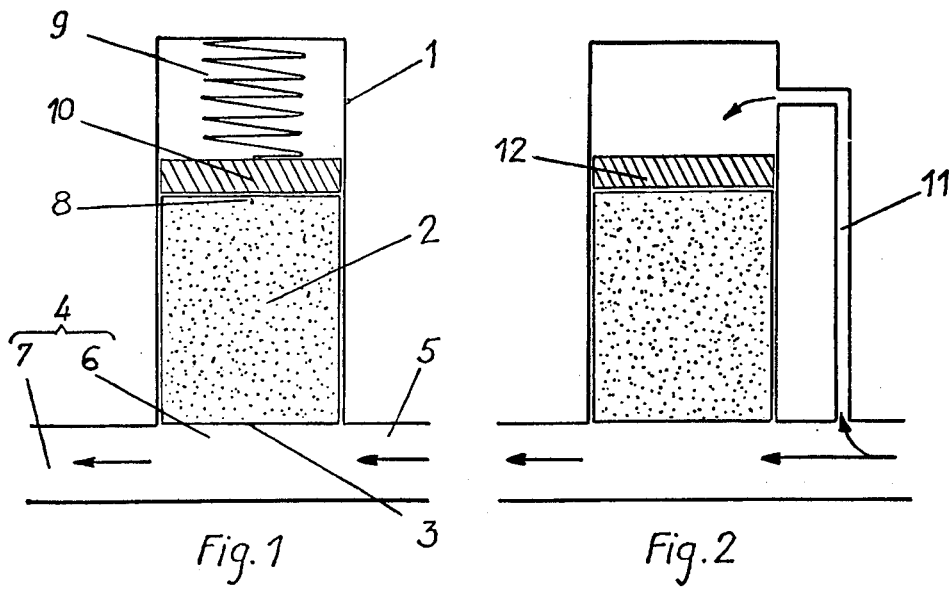
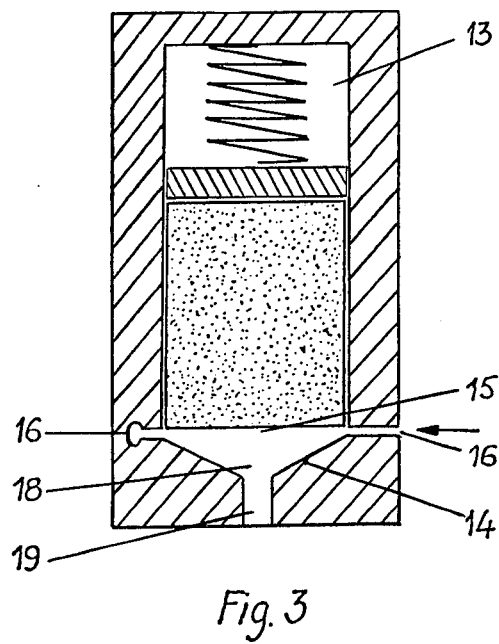
Fig. 1
Fig. 2
Fig. 3

DEVICE FOR MIXING CHEMICAL PRODUCTS WITH TAP WATER

This invention relates to a device for mixing chemical products with tap water which is particularly intended for use in apparatus for spraying pesticidal compositions.

Devices of this type have already been proposed. The principle on which they are based comprises introducing tap water under pressure into a mixing chamber where it comes into contact with a solid, generally water-soluble active material. The active material is progressively dissolved to form a mixture which then enters a spray nozzle.

Apparatus of this kind are of particular interest to amateur gardeners, because they do not require any physical effort, especially hand pumping, for placing the treatment solution under pressure before it is applied, because, in this case, pressurization is directly obtained by connection to the available water outlet of the distribution network.

German Pat. spec. No. 1,211,603, for example, describes a device of this kind, in which the inflowing stream of water is divided by manifolds into two separate streams, one of which becomes charged with active material by contact with a solid active material and subsequently rejoins the other stream to form a dilute suspension ready for spraying.

Although this apparatus undoubtedly has certain advantages, including compactness, the possibility of adjusting the rate of flow and robustness, its design is fairly complicated and, in addition, does not provide for the output of a treatment solution of uniform concentration because, as it is used, the surface area of the solid active material in contact with the branched stream of water decreases, as hence does the concentration of active material, which necessitates manual intervention during treatment either to reduce the rate of flow or to prolong the treatment. Manipulation of this kind is difficult to carry out by the amateur gardener and, in fact, the quantity of active material applied to the plant to be treated decreases during treatment and may reach a level where it is no longer effective without the user being aware of the fact.

These disadvantages which are troublesome to professionals rule out apparatus of this kind for amateurs for whom simple, reliable operation is required.

The object of the present invention is to obviate these disadvantages while, at the same time, retaining the advantages of existing apparatus. Accordingly, the invention relates to a device which is simplified by the fact that, instead of using two separate streams of water, it only uses a single stream of water which becomes charged with active material by tangential contact with a constant surface area of the active material which, although present in compact form, remains splittable. This compact, splittable active material will hereinafter be referred to as a "cartridge".

Accordingly, the invention relates to a device for homogeneously mixing with tap water chemical products in the form of a compact solid or cartridge splittable with water by passing a stream of water over these products, the device according to the invention comprising:

on the one hand, a magazine intended to accommodate the cartridge in such a way that it has at least one free, constant surface during splitting, on the other hand, a mixing chamber comprising a splitting zone defined on one side by the free surface of the cartridge and comprising lateral inlets for introducing tap water tangentially of that surface, and being distinguished by the fact that the inlets are tubular and are narrow cross-section, being distributed in a small number around the periphery of the magazine and being situated in a plane substantially perpendicular to the axis of the magazine, the splitting zone is extended by a homogenization zone (downstream of the splitting zone) for the mixture which is larger in volume than the splitting zone and is connected to it and which comprises an outlet opening for the mixture.

More precisely, the invention relates to a device of the kind described above, distinguished by the fact that, in addition, it comprises pressure means for keeping the free surface of the cartridge, during the useful life thereof, in firm contact with positioning means situated at the inlet end of the splitting zone of the mixing chamber.

The detailed description and the embodiments will be better understood from the accompanying drawings which are diagrammatic sectional views:

FIGS. 1 and 2 illustrate two variants of one embodiment of the device according to the invention;

FIG. 3 shows another embodiment of the device according to the invention;

Figures 4, 5, 6:
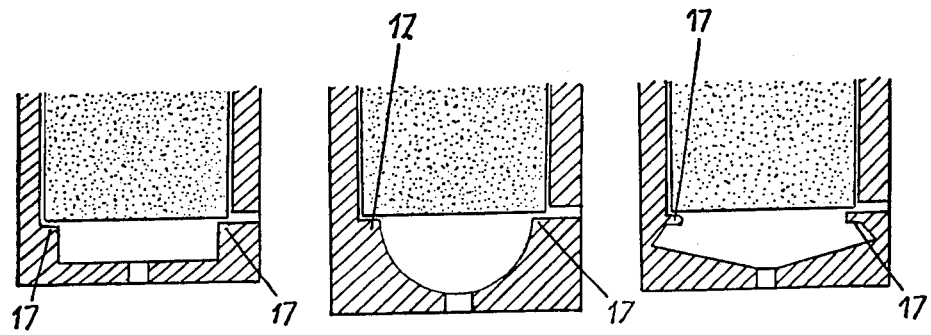
FIGS. 4 to 6 are partial views illustrating variants of the configuration of the mixing chamber.

In order to simplify their manufacture, although this is not absolutely essential, the magazine and the mixing chamber each have a main axis. These two axes may form with one another an angle ranging from 0° to 90°. However, two cases are of particular interest, on the one hand when the axes are perpendicular, on the other hand when they are coaxial.

One example of the first case is the device illustrated in FIG. 1. In FIG. 1, the magazine 1, for example cylindrical or prismatic in shape, contains a cartridge 2 of splittable material, of which one substantially flat surface 3 is free. The mixing chamber 4, for example cylindrical in shape, carries the water 5 under pressure in such a way that it arrives tangentially on the free surface 3 of the cartridge 2. Accordingly, the splitting zone 6 is situated immediately below the free surface 3 of the cartridge 2. The split material is then carried by the stream of water and gradually becomes mixed with the rest of the water in the homogenization zone 7 downstream of the splitting zone. The length of this zone is such that homogenization is complete. To insure that the free surface 3 of the cartridge 2 is always at the level of the stream of water, that surface 8 of the cartridge opposite to its free surface is subjected to a pressure (the necessary holding effect) so that the cartridge does not sink into the stream of water, this holding effect being obtained either by stops at the outlet end of the magazine 1 or by friction between the cartridge and the lateral wall of the magazine 1. The pressure may be applied by any suitable means, for example by means of a spring 9 which is fixed to the base of the magazine, and which bears on the cartridge either directly or indirectly through a piston 10 (cf. FIG. 1). A similar effect may even be obtained (cf. FIG. 2) by using a branch 11 of the main stream of water which opens into the magazine 1 and, by bearing on a piston 12, counterbalances the pressure of the main stream on the splitting surface 3 of the cartridge 2.

In one preferred embodiment of the invention, the magazine and the mixing chamber are substantially coaxial. FIG. 3 illustrates one preferred embodiment of such a device, in which the magazine 13 is cylindrical and the mixing chamber 14 conical. That part near the base of this inverted cone forms the splitting zone 15 into which open at least one and, preferably, at least two and, with advantage, from two to four tubular water inlets 16 opening tangentially of the lower free surface of the cartridge. These water inlets are preferably also arranged tangentially of the periphery of the cartridge in order to insure regular splitting. In practice, they are situated substantially in the plane of the free surface of the cartridge. The diameter of the water inlets 16 may vary over their length so as to regulate the loss of pressure. It has been found that good results are obtained with inlets approximately 1 mm in diameter provided upstream with a front cylindrical hole of larger diameter. The inlets are normally circular in cross-section, although they may have other cross-sections.

In addition, the positional stability of the cartridge is guaranteed by the conical form of the splitting zone 15 which, by tapering, forms a stop without any need for other stops to be provided. However, this form is by no means the only possible form, and the mixing chamber may have other forms such as, for example, cylindrical (cf. FIG. 4) or hemispherical (cf. FIG. 5), in which cases the presence of stops 17 becomes necessary, for example by selecting a cylinder or a sphere smaller in diameter than the magazine. There are further possibilities such as, for example (cf. FIG. 6), a downwardly widening frustoconical splitting zone, in which case stops not included in the configuration have to be used.

Finally, it should not be forgotten that, irrespective of the configuration of the splitting zone, the cartridge may be held in position by friction contact with the lateral wall of the magazine.

Referring again to FIG. 3, it can be seen that the water, having carried away some of the cartridge, enters that part of the cone near its apex which forms the homogenization zone 18. The surface area of the cone should be large enough to enable the mixture to follow a path long enough for homogenization to be satisfactory. Naturally, the same applies where the surface has any of the other forms referred to above. In the case of the conical surface, the apex angle should be between 90° and 170° and preferably between 110° and 150°, angles of approximately 120° being particularly suitable.

The homogenization zone terminates in an outlet 19 through which the aqueous mixture is discharged towards the output end of the device, optionally through a spray nozzle.

Figures 7, 8:
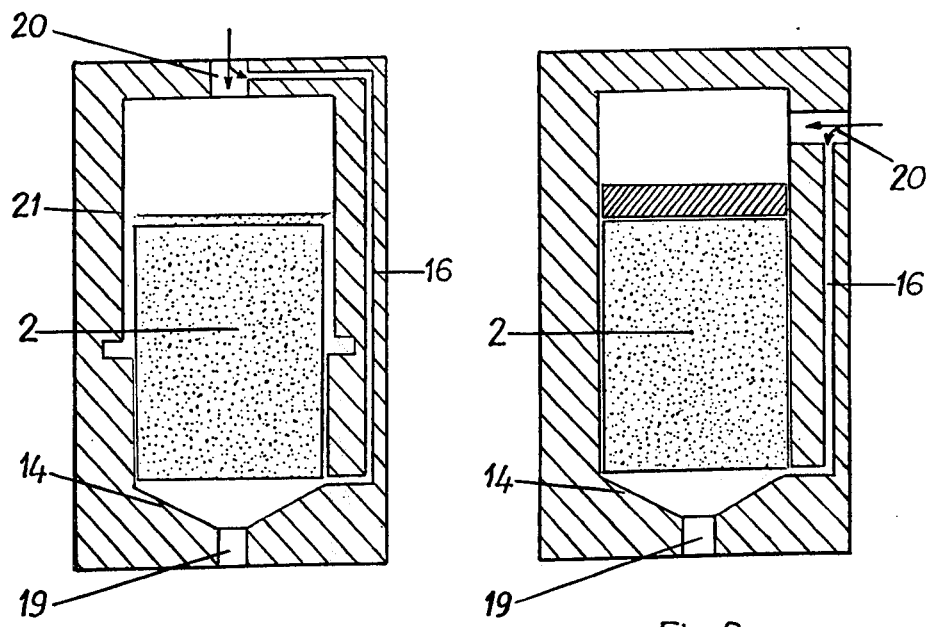
FIGS. 7 and 8 show two variants of the device illustrated in FIG. 3.

The pressure required for keeping the free surface of the cartridge is substantially one plane may be obtained by the means described in reference to FIGS. 1 and 2, i.e., either by means of a spring or by means of a branched stream of tap water. FIGS. 7 and 8 illustrate two examples incorporating the second of these two means, FIG. 7 corresponding to the case where the inlet 20 for water under pressure is substantially coaxial with the magazine, and FIG. 8 corresponding to the case where this inlet has an axis perpendicular to that of the magazine. The use of tap water as a means for applying pressure to the cartridge necessitates the use of a watertight piston. Excellent results have been obtained with a piston in the form of a disc fixed to a flexible watertight membrane, for example made of rubber, whose edges are shrunk onto the lower edges of the magazine which naturally presupposes that the magazine and the mixing chamber are separate and assembled, for example by screwing. The piston may even be in the form of a flexible membrane 20 made of a heat-formable plastics material, such as plasticized polyvinyl chloride or polyethylene, without a rigid disc (cf. FIG. 7) which forms a case serving simultaneously.

as a single wrapping which reinforces the stability of the cartridge and which enables it to be handled without any danger of contact with toxic products, and as a sealing means insuring the watertightness of the gun despite the use of water as pressure medium.

This membrane, optionally reinforced by a disc, has the further advantage that, when the cartridge is spent, the base of the membrane or the disc blocks the water inlet and/or outlet, which automatically stops the circulation of water.

In one more elaborate embodiment of the invention, the device may comprise several elemental "magazine/mixing chamber" assemblies which may be successively used and which may contain cartridges of different types. One particularly advantageous arrangement is that of a device comprising a cylinder of which each chamber is formed by an elemental assembly of the kind defined above.

The material of which the various components of the device according to the invention are made is not critical, with the proviso that it is sufficiently resistant to pressure. Suitable materials include metals and alloys and also plastics materials such as, in particular, ABS resins, polycarbonates, polyacetals and polyamides.

The device according to the invention is very simple in operation. The cartridge, optionally accommodated in the flexible membrane case, is first of all introduced into the magazine which is then closed. In the case of a spring, the pressure on the cartridge is obtained from this stage onwards. The device is then connected to the water tap with the possibility of the water being stopped just ahead of the device. When the water is released, it enters under pressure through the tangential inlets and splits the free surface of the cartridge. The jet charged with active material rotates, gradually descends along the wall of the mixing chamber and is then removed, for example through a spray nozzle. If the device comprises a water inlet through which water is introduced onto the piston bearing against the cartridge, the water immediately flattens the cartridge in its operative position. The device according to the invention is very flexible in use, because it may be fed with water under a pressure of from 1 to 10 bars, the average pressure of the distribution network being approximately 3 to 4 bars.

In addition, the device according to the invention had the advantage of supplying a very homogenous mixture irrespective of the pressure or the rate of flow of water, this effect being obtained by the combination of the mechanical or hydraulic pressure on the cartridge and the particular characteristics of the mixing chamber. In addition, the concentration of the mixture remains substantially constant during treatment because the splitting surface remains substantially the same.

This is why the device according to the invention is particularly suitable for forming part of a sprayer designed to be used by the public at large by virtue of its simplicity, its reliability and its compactness. In particular, excellent results have been obtained in sprayers of the kind used by amateur gardeners, the device according to the invention, in this case, being no larger than 10 cm in any dimension. However, this particular application is by no means exclusive and may be extended to washing, maintenance, etc.

We claim:

1. A device for homogeneously mixing chemical products with water in which the chemical product is embodied in a water-splittable cartridge, said device comprising an enclosure, stop means in the enclosure to subdivide the enclosure into a magazine dimensioned to receive the cartridge and an aligned mixing chamber with one side of the magazine open to the mixing chamber, said stop means retaining the cartridge within the magazine with a free surface of the cartridge exposed to the mixing chamber, said mixing chamber being formed of a splitting zone and a homogenization zone with the splitting zone adjacent the magazine, an outlet in communication with the homogenization zone, at least one inlet in the splitting zone in crosswise alignment with the interface between the magazine and the mixing chamber for the introduction of water tangentially into the mixing chamber for tangential engagement with the free surface of the cartridge whereby chemical product is split from the cartridge into the splitting zone and homogenized with water in the homogenization zone before issuing from the outlet.

2. A device as claimed in claim 1, which includes pressure means in operative engagement with the cartridge constantly urging the cartridge into engagement with the stop means.

3. A device as claimed in claim 2, wherein the pressure means comprises a piston member and a spring within the chamber and in operative engagement with the surface of the cartridge opposite the free surface.

4. A device as claimed in claim 2, wherein the pressure means comprises a watertight surface at the surface of the cartridge opposite the free surface and means for introducing water under pressure into the magazine on the side of the water-tight surface opposite the cartridge.

5. A device as claimed in claim 4, wherein the intermediate watertight surface is that of a piston.

6. A device as claimed in claim 5, wherein the intermediate watertight surface is that of a flexible impermeable membrane.

7. A device as claimed in claim 1, wherein the mixing chamber is substantially coaxial with the magazine.

8. A device as claimed in claim 7, wherein the cross-section of the mixing chamber at its inlet end is wider than at its outlet end.

9. A device as claimed in claim 8, wherein the mixing chamber is a cylinder which, at the level of the splitting zone, comprises the stop means which keep the free surface of the cartridge substantially in this same plane.

10. A device as claimed in claim 8, wherein the mixing chamber is in the form of a cone of which that section near the base forms the splitting zone, while the remainder of the cone forms the homogenization zone.

11. A device as claimed in claim 10, wherein the cone angle of the mixing chamber is from 90° to 170°.

12. A device as claimed in claim 10 in which the cone angle of the mixing chamber is within the range of 110° to 150°.

* * * * *